J. E. HUGHES.
AUTOMOBILE SIGNAL.
APPLICATION FILED APR. 10, 1916.
1,263,320.
Patented Apr. 16, 1918.
2 SHEETS—SHEET 1.
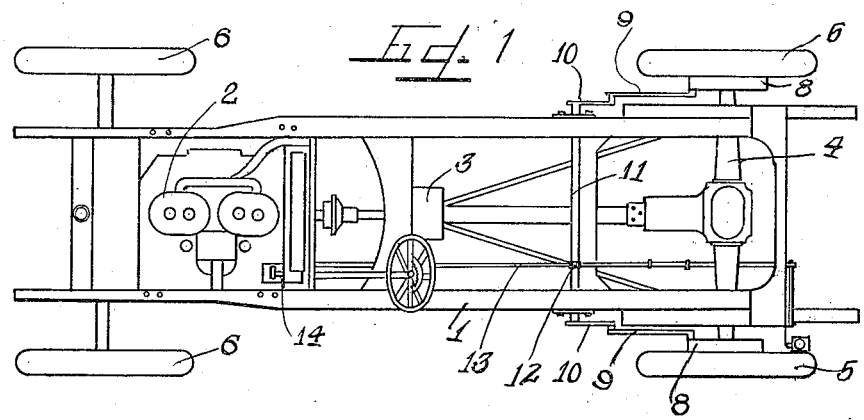
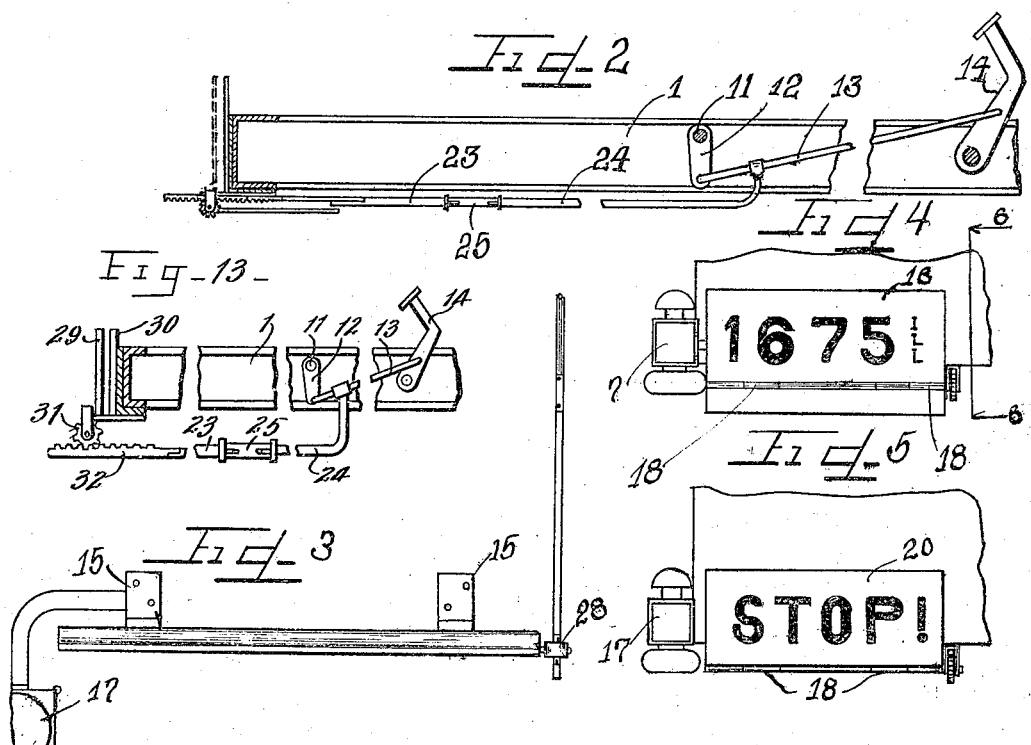

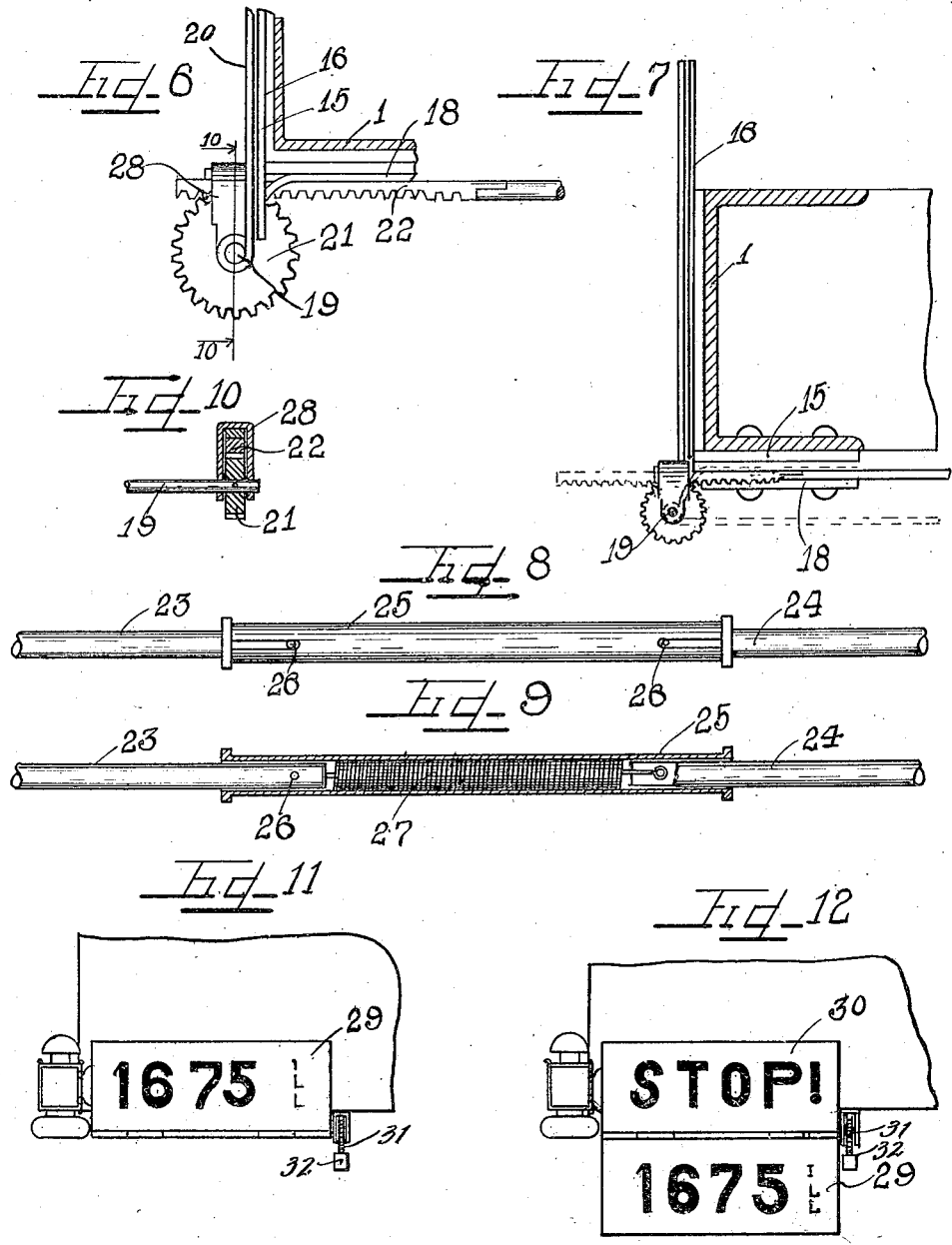

UNITED STATES PATENT OFFICE.

JOHN E. HUGHES, OF CHICAGO, ILLINOIS.

AUTOMOBILE-SIGNAL.

1,263,320.   Specification of Letters Patent.   Patented Apr. 16, 1918.

Application filed April 10, 1916. Serial No. 90,114.

*To all whom it may concern:*

Be it known that I, JOHN E. HUGHES, a citizen of the United States, and a resident of the city of Chicago, in the county of Cook and State of Illinois, have invented certain new and useful Improvements in Automobile-Signals; and I do hereby declare that the following is a full, clear, and exact description of the same, reference being had to the accompanying drawings, and to the numerals of reference marked thereon, which form a part of this specification.

This invention relates to an improved signal device for attachment upon automobiles or other vehicles wherein indication is made at the rear of the vehicle when a stop is intended to warn the drivers of other vehicles closely following.

It is an object therefore of this invention to provide a rear signal for attachment upon vehicles adapted to be moved into indicating position whenever the brakes or other mechanisms provided for retarding the speed of the vehicle are actuated, thereby signaling the driver of a vehicle following.

It is also an object of this invention to construct a rear signal for vehicles comprising a pivotally mounted plate with indicating character letters thereon, which is normally disposed in a concealed position and when operated is moved into view to warn vehicles following of an intention to stop the vehicle on which the device is mounted.

It is furthermore an object of this invention to construct a signal device particularly adapted for use on motor cars adapted to be connected at the rear thereof normally in a concealed position, and operatively associated with the brakes of the car, whereby actuation of the brakes operates the signal into view, concealing the rear license number plate and again returning to concealed position when the brakes on the vehicle are released.

It is finally an object of this invention to construct an improved type of vehicle rear signal normally in concealed position and connected to the brakes of a vehicle for actuation into a position for view when the brakes of the vehicle are operated.

The invention (in a preferred form) is illustrated in the drawings and hereinafter more fully described.

In the drawings:

Figure 1 is a top plan view of a motor car chassis equipped with a signaling device embodying the principles of my invention.

Fig. 2 is a fragmentary sectional view of a portion of the chassis illustrating the operative connections of my invention with the brake mechanisms of the vehicle.

Fig. 3 is a fragmentary top plan view of a portion of the device detached from the vehicle.

Fig. 4 is a fragmentary rear elevation of the device mounted on the vehicle and in concealed position out of use.

Fig. 5 is a similar view illustrating the device in signaling position.

Fig. 6 is a fragmentary sectional view of the mechanisms, taken on line 6—6 of Fig. 4.

Fig. 7 is a view similar to Fig. 6, illustrating the operation of the device into concealed position in dotted lines.

Fig. 8 is a fragmentary exterior view of the actuating rod of the device.

Fig. 9 is a similar view with parts broken away and shown in section.

Fig. 10 is a fragmentary detail section on line 10—10 of Fig. 6.

Fig. 11 is a view similar to Fig. 4, of a modified form of device.

Fig. 12 is a view thereof with the signal in operating position.

Fig. 13 is a view similar to that shown in Fig. 2, of the modified form of the device.

As shown in the drawings:

The reference numerals 1, indicate the side sills of the motor car chassis, on which is mounted an engine 2, driving the transmission 3, from which, through suitable mechanisms, the mechanisms within the rear axle 4, are driven to operate the rear driving wheels 5. Of course, front steering wheels 6, are provided, mounted in a usual and well known manner to support the forward end of the chassis. Associated with each of the rear wheels 5, are brake drums 8, and connected to actuate brakes therefor are links 9, pivoted to cranks 10, rigid on a shaft 11, journaled transversely of the chassis. Also rigidly secured upon said shaft 11, is another crank 12, to which a pull rod 13, is pivotally connected, leading to a pivotally mounted foot pedal 14.

As clearly shown in Figs. 3 and 6, angle brackets 15, are secured to the rear cross member of the chassis frame 1, and support a license number plate 16, rigidly in upright position thereon, and a tail lamp 17, is supported in a usual manner at the rear of the chassis frame in a position at one side of the license plate to illuminate the same. Secured to and beneath the horizontal portion of the brackets 15, as clearly shown in Fig. 7, are bracket plates 18, which project outwardly beyond the angle brackets 15, and are bent downwardly and beaded over or provided with tubular portions to receive a pintle shaft 19, journaled therethrough. A target or signal plate 20, is provided, with the word "Stop" lettered thereon, having its lower margin beaded over, as clearly shown in Fig. 6, and cut away at points therein to register with the hinge brackets 18, and receive inserted therethrough the pintle shaft 19. Said target plate 20, is rigidly secured upon the pintle shaft in any suitable manner so as to rotate therewith. Secured upon one end of the pintle shaft 19, is a pinion 21, and meshing therewith and adapted to impart rotation thereto to rotate the pintle shaft and the target plate therewith is a rack bar 22, slidably mounted beneath the rear cross member of the chassis frame. Connection between the slidable rack bar 22, and the brake pull rod 13, is provided for transmission of movement therebetween, and for this purpose a sectional rod is provided comprising sections 23 and 24, with their adjacent ends slidably mounted within a sleeve 25, which is slotted at its ends to receive engaging pins 26, therethrough, mounted in the ends of said rod sections. Secured to the ends of said respective rod sections 23 and 24, within the sleeve 25, is a spring 27, adapted to resist outward movement of said rod sections apart from one another. The rod section 23, is securely connected to the rack bar 22, and the rod section 24, is bent upwardly at its forward end and provided with a collar by which it is secured to the pull rod 13. A yoke shaped guide or guard 28, is journaled on the shaft 19, extending on each side of the pinion 21, and over the rack bar 22, to retain the rack bar in meshing engagement with the pinion.

In the modified form of my device illustrated in Figs. 11 to 13, the construction is similar to that already described, with the exception that I have shown a license plate 29, rigidly secured upon a pintle shaft with a license number on both surfaces thereof, so that when said pintle shaft is actuated by a pinion 31, and a rack bar 32, mounted below said pinion and connected to the sectional rod 23—24, the plate 29, is turned downwardly into a position shown in Fig. 12, with the license number on the inside of the license plate exposed. Rigidly secured at the rear of the chassis, in place of the number plate 16, of the prior construction, is a fixed target plate 30, bearing the word "Stop," which is exposed to view when said license plate has been moved to its position below the pintle shaft, by an inward movement of the rack bar 32, caused by a depression of the foot pedal 14.

The operation is as follows:

The position of the signal or target plate 20, is that shown in dotted lines in Fig. 2, that is, normally concealed in horizontal position beneath the body of the vehicle, but when the brake pedal 14, is depressed, as, for instance, in order to check the movement of the car, preparatory to making a turn or bringing the vehicle to a stop, the forward movement of the brake rod 13, transmits such movement to the sectional rod 23—24, thereby withdrawing the rack bar 22, inwardly, and rotating the pinion 21, through an angle of substantially 270 degrees to swing the signal target plate 20, upwardly and over the surface of the license plate 16. As soon as the brake pedal 14, is released, of course the spring usually associated with the brake mechanism of the vehicle will serve to return the pedal to normal, and with it the signal operating mechanism, which will cause a return of the target plate 20, to concealed position beneath the car, again displaying the fixed license plate 16, to view. Due to the manner in which the sectional rod is constructed in the event that the movement of the pull rod 13, exceeds that of the possible movement of the rack bar 22, the spring 27, will extend, permitting elongation of the sectional rod. On the other hand, when the pull rod 13, moves rearwardly to normal the rod sections 23 and 24, act through the sleeve 25, as a compression member to positively actuate the rack bar.

In the modified form of device illustrated in Figs. 11 to 13, a fixed target plate 30, is provided in place of the license plate 16, of the prior construction, and said fixed target plate 30, is normally concealed by the number plate 29, bearing the license number on each surface thereof. Under normal conditions when the license plate 29, is in its upper position, the signal target plate 30, is concealed and actuation of the brake will serve to draw the rack bar 32, inwardly to swing the license plate 29, downwardly to expose the target plate to view. The object in using the license plate in conjunction with the target plate in each of the constructions described, is to make the display of the signal at the rear of the vehicle more noticeable to drivers of vehicles behind.

I am aware that various details of construction may be varied through a wide range without departing from the principles of this invention, and I therefore do not purpose limiting the patent granted otherwise than necessitated by the scope of the appended claims.

I claim as my invention:

1. A signaling device of the class described to be used in conjunction with the license plate at the rear of a vehicle comprising a shaft pivoted beneath the license plate, a target plate rigid thereon normally swung downwardly and rearwardly into concealed position, and a rack and pinion means connected to be actuated by the brake mechanism of the vehicle when the brake is applied to move the target plate upwardly and over the license plate.

2. In a signal device of the class described to be used in conjunction with the license plate of a vehicle, a movably mounted signal plate associated therewith, and a rack and pinion means connected with said signal plate to move the same upwardly in front of said license plate.

3. In a signal device of the class described the combination with a stationary plate, a shaft rotatably mounted therebeneath, a signal plate secured thereon to rotate therewith, a pinion rigidly secured on one end of said shaft, and racked means engaging said pinion for rotating said shaft to move said signal plate upwardly to conceal said stationary plate.

4. In a signal device of the class described for a vehicle, a pivotally mounted plate, a pivot shaft on which the same is secured, a pinion on the end of said shaft, a horizontal rack bar for operating said shaft by engagement with said pinion, an extensible pull rod connected to said rack, and means for transmitting movement to said extensible pull rod to actuate said rack and pinion to move said plate upwardly into display position.

5. In a signal device of the class described, a plate, a shaft rotatably mounted therebelow, a second plate rigidly secured on said shaft, a rack and pinion means connected with said shaft, and mechanisms connected with said rack and pinion means for actuating the same to rotate said shaft to move said second plate into a position to conceal or expose said first mentioned plate.

6. In a device of the class described, a plate, a shaft rotatably mounted therebelow, a second plate movable with said shaft, a rack and pinion means connected with said shaft, and manually operatable mechanisms connected with said rack and pinion means to rotate said shaft and second plate.

In testimony whereof I have hereunto subscribed my name in the presence of two subscribing witnesses.

JOHN E. HUGHES.

Witnesses:
LAWRENCE REIBSTEIN,
EARL M. HARDINE.

Copies of this patent may be obtained for five cents each, by addressing the "Commissioner of Patents, Washington, D. C."